United States Patent [19]

Morii et al.

[11] 4,301,526

[45] Nov. 17, 1981

[54] TONEARM CONTROL SYSTEM BASED ON ABSOLUTE TONEARM POSITION

[75] Inventors: Takashi Morii; Junichi Kurata, both of Tokorozawa, Japan

[73] Assignee: Pioneer Electronic Corporation, Tokyo, Japan

[21] Appl. No.: 14,787

[22] Filed: Feb. 26, 1979

[30] Foreign Application Priority Data

Feb. 24, 1978 [JP] Japan .................................. 53-20635

[51] Int. Cl.³ ............................................. G11B 17/22
[52] U.S. Cl. ......................................... 369/33; 369/41
[58] Field of Search ................. 274/9 R, 9 RA, 15 R, 274/23 A; 179/100.4 D; 360/78; 369/33

[56] References Cited

U.S. PATENT DOCUMENTS

| | | | |
|---|---|---|---|
| 3,662,363 | 5/1972 | Chertok | 179/100.4 D X |
| 3,937,903 | 2/1976 | Osann, Jr. | 179/100.4 D |
| 3,993,315 | 11/1976 | Hansen et al. | 274/23 A X |
| 4,093,832 | 6/1978 | Isaacson et al. | 179/100.4 D |
| 4,114,893 | 9/1978 | Leach et al. | 274/9 RA |
| 4,135,086 | 1/1979 | Baba | 274/9 RA X |
| 4,166,621 | 9/1979 | Isaacson et al. | 274/9 RA |

Primary Examiner—Aristotelis M. Psitos
Attorney, Agent, or Firm—Sughrue, Mion, Zinn, Macpeak & Seas

[57] ABSTRACT

A tonearm control device in which tonearm position is detected by counting output pulses generated in response to a reversible electric motor output used for providing horizontal tonearm movement. A sensor is employed to detect non-recorded portions between recorded bands of music and also the initial position of a record disk. The sensor is supported on a supporting arm separate from the tonearm. The output pulses are counted in a counter of a RAM and the number of pulses corresponding to a distance between the sensor and the stylus of the cartridge is added in an adder in a CPU to the content of the counter. The output of the CPU is memorized in assigned positions of a memory in the RAM, the number of which corresponds to numbers of selected music. The contents of the memory are compared with the output pulses. When coincidence occurs, reproduction of the band of music is achieved. Hence, it is possible to change the cartridge independent of the sensor.

12 Claims, 2 Drawing Figures

TONEARM CONTROL SYSTEM BASED ON ABSOLUTE TONEARM POSITION

BACKGROUND OF THE INVENTION

This invention relates to a tonearm drive control device, and more particularly to a tonearm drive control device for use in an audio record player having an automatic music selection mechanism (hereinafter referred merely to an automatic music selection record player, when applicable).

An automatic music selection record player is generally provided with a memory where music numbers each corresponding to desired music to be reproduced are memorized. There is also provided in the vicinity of a cartridge a sensor capable of detection both non-recorded portions of a record disk between an initial record groove and an end record groove of music and an initial record groove of record disk by recognition of a variation of reflection coefficient in the surface of the record disk. Hence, the memory is controlled by the output of the sensor to carry out a music selection operation.

Generally, because the above mentioned conventional record player employs the output of the sensor only as a drive control signal in order to carry out the music selection operation, every end of music reproduction signal returns a tonearm to an arm rest. Then, music selection operation starts according to music selection information stored in the memory. Accordingly, this mode of operation is disadvantageous in that selection operation requires a relatively long period of time. Furthermore, the conventional record player has another disadvantage because it is impossible to start the reproduction of music from the middle of the disk. In this case, it is obvious that the reproduction of music is possible if a record disk is initially scanned to memorize all positions of initial record grooves in a memory in advance before starting of the reproduction. However, this results in prolonged periods of wasted time to first scan the record.

In view of the foregoing difficulties of the prior art, the present inventors have proposed in a commonly assigned co-pending U.S. patent application Ser. No. 014,793 having the same filing date and entitled "TONEARM CONTROL SYSTEM" an improved automatic music selection record player in which the sensor for detecting the non-recorded portions of the record disk is provided directly on the cartridge: In this case, however, it is impossible to use a normally commercially available cartridge. Accordingly, this type record player is not economical, since it does not employ standard audio components.

SUMMARY OF THE INVENTION

Accordingly, an object of this invention is to eliminate the foregoing drawbacks in the conventional record player.

Another object of this invention is to provide a tonearm drive control device for use in an automatic music selection record player, which carries out an automatic music selection operation accurately and rapidly.

Still another object of this invention is to provide a tonearm drive control device for use in an automatic music selection record player, which is capable of starting the reproduction of music recorded on a record disk from any position without a preliminary scanning operation for memorizing all positions of initial records grooves.

A further object of this invention is to provide a tonearm drive control device for use in an automatic music selection record player whose cartridge can be changeable in a normal manner.

These and other objects of this invention are accomplished by the provision of an automatic music selection record player having a tonearm drive control device. In the record player according to this invention, the position of a tonearm is detected by counting the number of pulses generated in response to the rotation of a reversible electric motor for driving the tonearm horizontally. When a sensor detects a non-recorded portion between an initial record groove and an end record groove of music and an initial record groove of record disk by way of recognizing a variation of reflection coefficient in the surface of record disk, it produces an output signal to a CPU. The sensor is individually supported by a supporting arm which is mounted on a sliding member together with the tonearm in such a manner that it is positioned nearer to the center of record disk with respect to a cartridge. Therefore, it is possible to change the cartridge without affecting the sensor. In order to compensate for the distance between the sensor and the cartridge, an adder is provided in the CPU, so that the number of pulses corresponding to the distance is added into the number of pulses counted in a counter of a RAM. The pulses counted in the counter are generated in response to the rotation of the motor. The output signal obtained through the adder, which is representative of the initial position of each band of music to be reproduced is stored at an assigned position of a memory in the RAM. The address number of the assigned position corresponds to a music number selected by an operation of a key board. The content of the memory is compred with that of the counter in the RAM. Hence, it is possible to carry out the reproduction of music in any order or to start it from any position according to the contents of a music number memory, which is previously stored by the operation of the key board.

This invention will be described hereinafter with reference to its preferred embodiment shown in the accompanying drawings.

DETAILED DESCRIPTION OF THE PREFERRED EMBODIMENT

Figure 1:
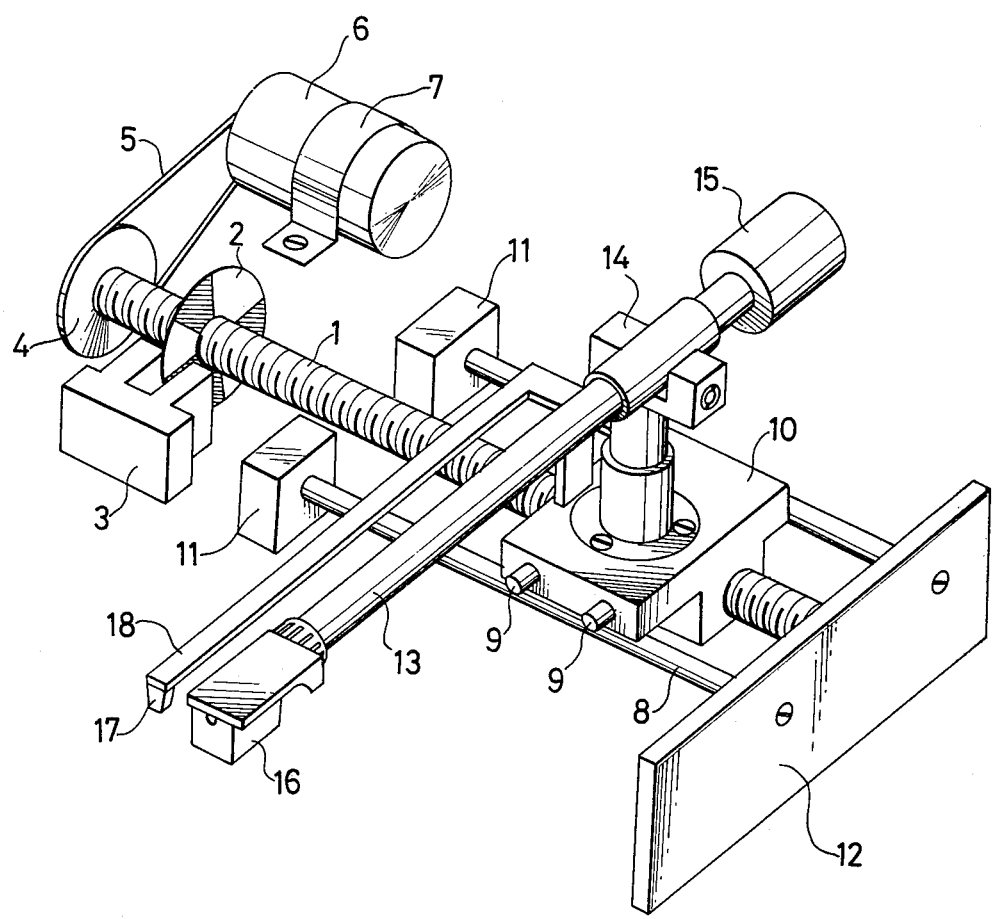
FIG. 1 is a schematic perspective view of one preferred embodiment of a linear tracking type tonearm assembly for use in an automatic music selection record player according to this invention.

In FIG. 1 which is a schematic perspective view of one preferred embodiment of a linear tracking type tonearm assembly according to this invention, a lead screw or worm-gear member 1 has a horizontal center axis with one end rotatably supported on a supporting member 12 of a record player housing. The other end is provided with a drive pulley 4. The pulley 4 is driven via a belt 5 by a reversible electric motor 6 which is fixed to a proper portion of the player housing by the use of an attachment member 7. A sliding member or carriage 10 is provided with rollers 9 and a threaded internal engaging portion which engages with the gear section of the worm-gear member 1. Hence, by rotation of the worm-gear 1, the carriage moves along a pair of guide rails 8 in a stable manner and the worm-gear member 1 in accordance with the direction of rotation of the worm-gear member 1 driven by the motor 6. Accurate alignment of the guide rails is achieved by mounting one end in the supporting member 12 and maintaining a parallel arrangement by the use of alignment blocks 11 at the opposite end. The alignment blocks are attached to the housing in any suitable manner.

A tonearm 13 is supported by an arm holder 14 mounted on the sliding member 10, so that it can only move in a vertical direction with respect to the carriage 10. The tonearm 13 is provided with a balance weight 15 at one end and it is provided with a cartridge 16 at the other end thereof. A sensor 17, well known in this art, is used for detecting a non-recorded portion of record disk between an initial record groove and an end record groove of music band and initial record groove of a record disk. It is individually supported by a supporting arm 18 which is coupled to the sliding member 10 together with the tonearm 13, in such a manner that it is positioned nearer to the center of record disk with respect to the stylus of the cartridge 16. That is, the sensor is positioned inside the cartridge with respect to the axis of revolution of the record disk.

A shutter member 2 composed of light permeable portions and light impermeable portions is integrally formed at a proper portion of the worm-gear member 1. The light permeable portions and the light impermeable portions are alternately arranged, as shown in FIG. 1, to form an optical encoder that generates three pulses per one rotation of the worm-gear member 1. Furthermore, a photo interruptor 3 having a pair of light emitting elements and a light receiving sensor is disposed to detect the number of rotations of the worm-gear member 1 in such a manner that the light emitting element and the light receiving sensor face each other. Also, as shown in FIG. 1, the shutter member 2 passes through the gap defined by the light emitting element and the light receiving sensor to periodically interrupt light emitted from the light emitting element.

Figure 2:
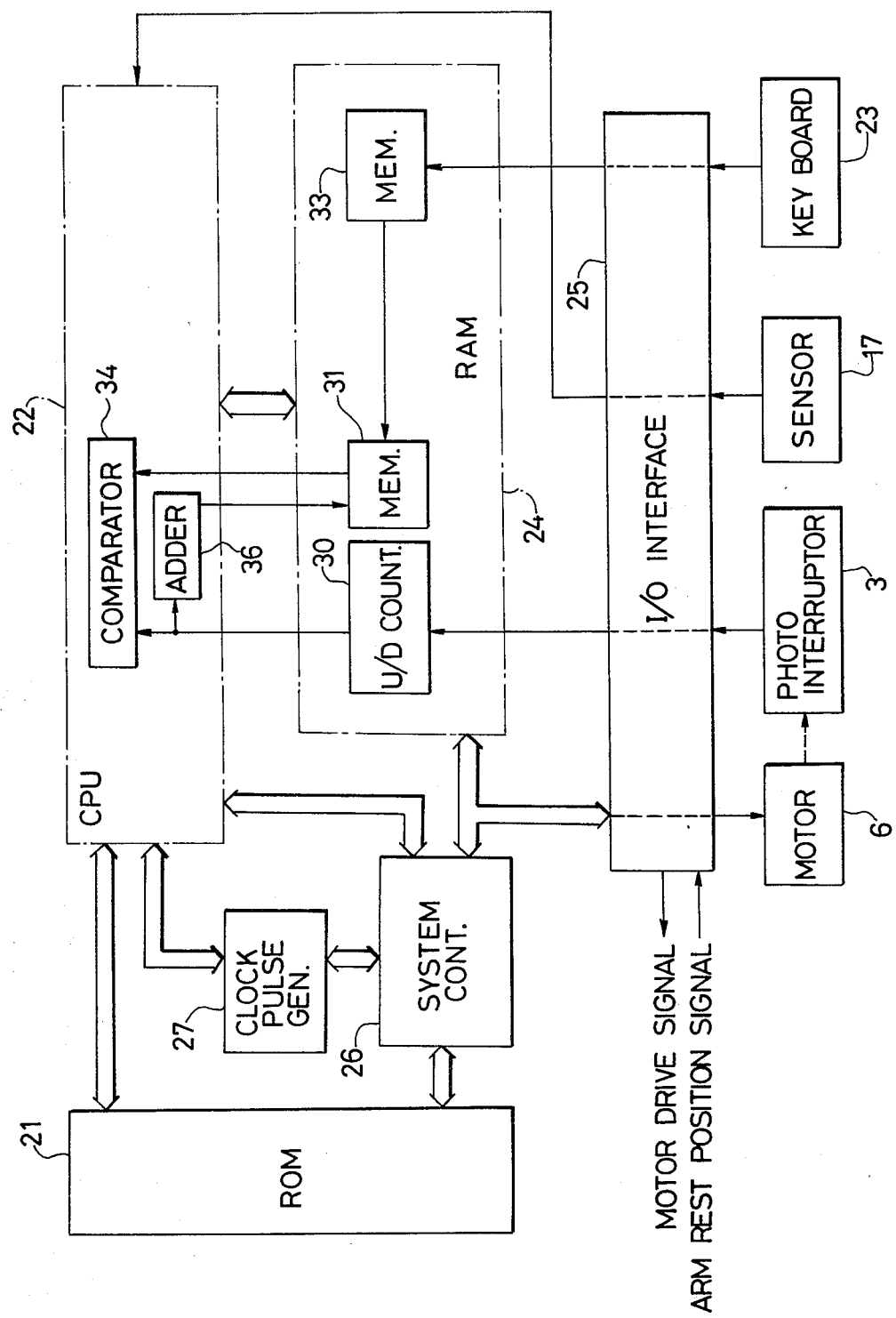
FIG. 2 is a block diagram illustrating one preferred example of a tonearm drive control system for the linear tracking type tonearm assembly as shown in FIG. 1.

FIG. 2 is a block diagram illustrating one example of a tonearm drive control device for the linear tracking type tonearm assembly as shown in FIG. 1. Reference numeral 21 designates a read only memory (ROM) where a program for controlling respective component sections in the tonearm drive control device to deal with several situations is stored in advance of operations, The program is read out according to demands to a central processing unit (CPU) 22 where the read out program is decoded to control the operation of the component sections in the drive control device.

The output signal of the photo interruptor 3 representative of the number of rotations of the motor 6, i.e., the number of rotations of the worm-gear member 1, the output signal of the sensor 17 and the output signal of a key board 23 for selecting music and designating the desired music numbers are applied together with a signal representative of the position of the arm rest through an INPUT/OUTPUT interface 25 to a random access memory (RAM) 24 in order to transiently store them therein.

A system controller 26 is interposed between the CPU 22 and the ROM 21, the RAM 24 and the I/O interface 25 to control their operation. The system controller 26 and the CPU 22 are operated by clock pulses generated by a clock pulse generator 27. A motor control signal for controlling the direction of rotation of motor 6 and a tonearm operation signal such as a tonearm elevation signal or a tonearm descent signal for controlling the vertical movement of the tonearm produced by the above component sections of the tonearm drive control device are also outputted through the I/O interface 25.

Specifically, the RAM 24 is composed of an UP/DOWN counter 30, a music address memory 31 and a music selection order memory 33. In order to recognize the position of tonearm from a predetermined reference position during reproduction, the U/D counter 30 operates to up/down-count the number of pulses representative of the number of rotations of motor 6, that is the number of rotations of the worm-gear member 1 generated by the photo interruptor 3. In this case, assuming that the motor 6 rotates in forward direction to horizontally slide the tonearm 13 toward the center of record, the U/D counter 30 is designed to count up the number of pulses. Assuming that the motor 6 rotates in reverse direction to horizontally slide the tonearm 13 toward the arm rest, U/D counter 30 is designed to count down the number of pulses.

In one preferred example of this invention, the above mentioned standard position is determined at the position of the arm rest, and the U/D counter 30 is designed to be reset to "0" when the tonearm stays at, or is returned to the arm rest. Therefore, the position of the tonearm, the position of the initial record groove of music band or record disk and the like are defined by the number of pulses counted by the U/D counter 30.

The music address memory 31 operates to store the contents of the U/D counter 30 at an assigned position upon an occurrence of the output pulse signal of the sensor 17. In this case, however, due to the arrangement of the sensor 17 and the cartridge 16, it is necessary to provide an adder to eliminate the distance, where the number of pulses corresponding to the distance is added into the content of the U/D counter 30. In this preferred embodiment of the tonearm assembly as shown in FIG. 1, the distance is set to for instance 19.5 mm. Accordingly, assuming that a pitch of the worm-gear member 1 is set to 0.75 mm and three pulses per one rotation of the worm-gear member 1 are generated by the photo interruptor 3, the distance of 19.5 mm can be converted to 78 pulses. The 78 pulses is obtained by an equation of (19.5 mm $\times$ 3 pulses $\div$ 0.75 mm = 78 pulses). Therefore, as shown in FIG. 2, an adder circuit 36 is provided in the CPU 22, so that it operates to add 78 pulses into the content of the U/D counter 30 upon an occurrence of the output pulse signal of the sensor 17. Then, the output of the adder 36 is applied to the memory 31 to be stored at an assigned position thereof. The address number of the assigned position corresponds to a number of music to be reproduced, which is designated by the operation of the key board 23.

The music selection memory 33 operates according to the selected order of music to be played and designated by the operation of the key board 23.

The CPU 22 comprises the above mentioned adder circuit 36 and a comparator 34. The comparator 34 is employed for comparing the content of the U/D counter 30 with that of the memory 31 upon an occurrence of an output pulse signal produced by the sensor 17. According to the comparison result of the comparator 34, a tonearm operation signal and/or a motor control signal are then outputted via the I/O interface 25.

In the above tonearm drive control device, a power source is connected to a record player unit, and then the ROM 21 is placed in a so-called run-state. According to the program stored in the ROM 21, first the fact of whether the tonearm is on the arm rest or not is ascertained. If the tonearm is on the arm rest, the U/D counter 30 in the RAM 24 is reset to "0" to be able to receive the output signal from the keyboard 23 at any time.

The operation of the tonearm drive control device will now be described under an assumption that music selection keys 2, 4 and 1 of the key board 23 are operated in that order. Upon the operation of the key board 23, binary coded signals representative of the respective music numbers of 2, 4 and 1 are stored in that order at assigned successive portions of the memory 33 in the RAM 24 via the I/O interface 25. Subsequently, according to the program, in the case where the fact that the coded music has been stored at a first assigned position of the memory 33 is ascertained, the motor 6 starts to rotate in the forward direction to horizontally slide the tonearm 13 toward the center of record disk. During this movement of tonearm 13, the U/D counter 30 in the RAM 24 continues to count up the number of pulses generated from the photo interruptor 3. Thereafter, in the case when the sensor 17 which is individually provided with respect to the cartridge 16 detects an initial record groove of record disk, the sensor 17 produces one output pulse via the I/O interface 25 to the CPU 22. Upon receipt of this output of the sensor 17, the adder circuit 36 operates to output to the memory 31 its contents, i.e., the sum of the number of pulses generated by the photo interruptor 3 and the pulse signal having 78 pulses, representative of an address of the initial record groove of the record disk. The memory 31 stores the contents of the adder 36 at the first assigned position thereof. At this time, the number of the band of music which should be initially reproduced, has been already stored as a coded number of "2" at the first assigned position of the memory 33. Then, according to the program, the contents stored at the second assigned position of the memory 31, which is representative of an address of the initial recorded groove of the second band of recorded music, is read out to be compared with the contents of the U/D counter 30 in the comparator 34. In this case, however, because no contents has been stored at the second assigned position of the memory 31 (the content being set to "0", for example), the CPU 22 produces a non-coincidence signal to the I/O interface 25 in order to output a motor control signal to the motor 6. Therefore, the motor 6 continues to rotate in the forward direction.

When the sensor 17 detects a non-recorded portion between the end record groove of the first band of recorded music and the initial record groove of the second band of recorded music, it produces one output pulse to the CPU 22. Then, the adder circuit 36 operates to output its contents representative of the initial position of the second band of recorded music. The memory 31 stores the contents of the adder 36 at the second assigned position of the memory 31. According to the program, the contents stored at the second assigned position of the memory 31 are compared with that of the counter 30 in the comparator 34. Hence, when the stylus of the cartridge 16 reaches the initial record groove of the second band of recorded music, the contents of the U/D counter 30 coincide with that of the memory 31. As a result, the CPU 22 produces a coincidence signal to the I/O interface 25. According to the program, a motor stop signal and a tonearm descent signal are applied to start the reproduction of the second band of recorded music from the I/O interface 25 to a motor 6 and a well known tonearm drive mechanism, respectively.

During the reproduction of the second band of recorded music, the U/D counter 30 continues to count the number of pulses generated by the photo interruptor 3 according to the movement of the tonearm 13 in horizontal direction. When the sensor 17 reaches the non-recorded portion between the end record groove of the second band of recorded music and the initial record groove of the third band of recorded music, it produces one output pulse to the CPU 22. Then, the adder circuit 36 operates to output its contents representative of the initial position of the third band of recorded music. The memory 31 stores the contents of the adder 36 at the third assigned position thereof. Thereafter, when the reproduction of the second band of recorded music is completed, according to the program, the coded music band number "4" to be reproduced subsequently is read out from the memory 33. As a result, the contents stored at the fourth assigned position of the memory 31 is outputted to the comparator 34 wherein it is compared with the content of the U/D counter 30. Because no contents has been stored at the fourth assigned position of the memory 31, the CPU 22 produces the non-coincidence signal to the I/O interface 25. The I/O interface 25 first produces a tonearm elevation signal and then it outputs the motor drive signal to the motor 6, so that the motor 6 rotates in the forward direction to move the tonearm 13 toward the center of record disk. In this case, the U/D counter 30 operates to count up the number of pulses generated by the photo interruptor 3. Thereafter, the sensor 17 detects the non-recorded portion between the third band of recorded music and the fourth band of recorded music. It produces one output pulse to thereby cause the adder 36 to add its contents into that of the counter 30, and the output of the adder 36 representative of the initial position of the fourth band of recorded music is then stored at the fourth assigned position of the memory 31. The tonearm 13 further continues to move in the forward direction, until the content of the counter 30 coincides with that stored at the fourth assigned position of the memory 31. As a result, the CPU 22 produces the coincidence signal to the I/O interface 25. The I/O interface 25 first produces the motor stop signal to the motor 6, and it produces the tonearm descent signal to start the reproduction of the fourth band of recorded music according to the program. As is clear from the above description, the counter 20 continues to count up the number of pulses generated by the photo interruptor 3 during the reproduction of music.

When the sensor 17 reaches the non-recorded portion between the fourth band of recorded music and the fifth band of recorded music, it produces one output pulse. The adder operates in the above described same manner, so that the contents representative of the initial position of the fifth band of recorded music is stored at the fifth assigned position of the memory 31.

When the reproduction of the fourth band of recorded music is completed, the coded music number of "1" to be reproduced subsequently is read out from the memory 33. Accordingly, the content which has been stored at the first assigned position of the memory 31, is compared with that of the U/D counter 30 in the comparator 34. As a result, the non-coincidence signal is applied to the I/O interface 25. The I/O interface 25 then produces the tonearm elevation signal together with the motor reverse signal.

It is apparent that the direction in which the motor 6 should be rotated is determined in accordance with the result of the comparison in the comparator 34.

As the tonearm 13 is moved toward the arm rest by the rotation of the motor 6 in the reverse direction, the U/D counter 30 operates to count down the number of pulses which is also generated by the photo interruptor 3. When the tonearm 13 reaches the initial position of the first band of recorded music, the content of the U/D counter 30 is coincident to the content stored at the first assigned position of the memory 31. Accordingly, the coincidence signal is produced from the CPU 22 to the I/O interface 25, and the motor stop signal and the tonearm descent signal are thus applied to the motor 6 and the tonearm driving mechanism, respectively.

Because an address representative of the end position of the first band of recorded music has been already stored at the second assigned position of the memory 31 as that representative of the initial position of the second band of recorded music, the reproduction of the first band of recorded music continues until the contents of the U/D counter 30 coincides with that stored at the second assigned position of the memory 31, and then the tonearm 13 is elevated from the surface of the record disk. After it has been ascertained that a music number to be subsequently reproduced is not stored in the memory 33, the motor reverse signal is applied to the motor 6 via I/O interface 25 according to the program. Then, the tonearm 13 is returned back above the arm rest, and finally lowered onto the arm rest. The automatic music selection operation for reproducing in the designated order is completed.

The automatic music selection operation for starting from the middle part of the recorded music will be described. For example, in the case where the reproduction starting from the middle part of the second band of recorded music is further required after the above described reproduction of the first recorded music, a signal corresponding to the coded music number of "2.5" is read out from the memory 33, and then according to the program of the ROM 21, the CPU 22 operates to store in an appropriate assigned position of the memory 31 the signal representative of an initial position of the 2.5th band of recorded music obtained by a calculation based on the stored initial address of the second and third bands of recorded music. After the elevation of the tonearm 13, the motor 6 continues to rotate until the contents of the U/D counter 30 is coincident with that of the memory 31, and the tonearm can reach the desired position of the second band of recorded music. Therefore, it is possible to start the reproduction from any middle position of the bands of recorded music.

It should be noted that, in the case where the reproduction starting from the middle part of the second band of recorded music is required after all information stored in the memory 13 are completely released, an operation must be required in addition to the above described operation to store the initial position of respective second and third bands of recorded music in the memory 31. That is, the sensor 17 moves up to the initial position of the third band of recorded music for the additional operation, and the tonearm 13 is then returned to the desired middle position of the second band of recorded music.

The above mentioned component sections such as the CPU 22, the ROM 21, the RAM 24, the I/O interface 25, the system controller 26 and the click pulse generator 27 can be integrally formed as a micro-processor. This results in minimizing the size of the device. For example, a variety of commercially available micro processors may be used and suitably programmed. The conversion of sensor output to digital signals in the I/O interface 25 is a common operation as well as preprogramming of the RAM 24. Hence, the hardware components shown in FIG. 2 can be obtained from standard available micro-processor units with suitable programming. The RAM, ROM, CPU, clock pulse generator, system controller and I/O interface exist as an integrated circuit designated as MELCS 82 sold by MITSUBISHI DENKI K.K. If the components are separately configured, an INTEL 8080A may be used as the CPU 22. In this case, the clock pulse generator 27 may be an INTEL 8224, the system controller 26 an INTEL 8228 and the I/O interface 25 an INTEL 8255. Obviously, RAM's compatible with these components can be utilized dependent only on cost and memory capacity.

It is apparent that modifications may be made without departing from the essential scope of this invention.

What is claimed is:

1. A tonearm drive control device for use in playing a record disc having bands of recorded music separated by non-recorded portions comprising:
   a reversible electric motor;
   a vertical tonearm drive means for vertically moving a tonearm;
   horizontal tonearm drive means responsive to the rotation of said motor to horizontally move said tonearm;
   first detecting means for detecting the position of said tonearm in a horizontal direction with respect to a predetermined reference position and generating a first output in response thereto;
   second detecting means for detecting non-recorded portions of a record disk and generating a second output in response thereto, said second detecting means being mounted on a supporting member moveable with said tonearm and offset from said tonearm in a horizontal direction and aligned with a stylus carried by said tonearm;
   adding means for generating a distance signal representative of the distance in horizontal direction between said second detecting means and said stylus and for adding said distance signal to said first output and generating a third output representative of a position of a band of recorded music in response thereto;
   first memory means receiving said third output from said adding means and operating to store said third output at assigned positions therein in response to an occurrence of said second output, said first memory, in response to an address signal, providing as a memory output the contents of an addressed first memory location;
   selecting means for selecting desired music to be reproduced and generating a selection signal representative of an order of the selected music;
   second memory means receiving said selection signal from said selecting means and generating said address signal in response thereto, said address signal corresponding to the band number of recorded music to be played; and comparator means for comparing said first output with said memory output;

wherein said reversible electric motor and both said tonearm drive means are controlled by the outputs of said comparator means.

2. The device of claim 1, wherein said first detecting means comprises a signal source for generating counting signals corresponding to movement of said tonearm and an up-down counter for receiving said counting signals in response to a tonearm movement, the output of said counter constituting said first output, said adding means providing said third output to said first memory means in response to a receipt of said second output.

3. The device of claim 2, wherein said first and second memory means and said counter means comprise a random access memory section, said device further comprising interface means for receiving the outputs of said first and second detecting means and said selector means and converting outputs into binary coded signals.

4. The device of claim 1, 2 or 3, wherein said first detecting means comprises an encoder disk responsive to rotation of said reversible electric motor and sensor means responsive to disc rotation.

5. The device of claim 4, wherein said horizontal tonearm drive means comprises a lead screw rotated by said electric motor, a carriage mounted for movement on said lead screw, said carriage having a tonearm mounting and said encoder being mounted on said lead screw.

6. The device of claim 5, further comprising guide means for aligning said carriage.

7. The device of claim 1, 2 or 3, wherein said adding means comprises an adder circuit receiving the output of said first detecting means in the form of pulses and adding a predetermined number of pulses to said first output to correct the position of said stylus relative to said second detecting means.

8. The device of claim 1, 2 or 3, wherein said selecting means comprises keyboard means for inputting a selected playing order of said bands of music on said record.

9. The device of claim 3, further comprising a read only memory for providing control signals to said random access memory said interface means and said first and second comparators.

10. The device of claim 9, further comprising a clock pulse generator for providing timing signals.

11. The device of claim 1, 2 or 3, wherein said supporting member is mounted on a carriage, said carriage carrying a tonearm mounting said supporting arm extending from said carriage in a direction parallel to said tonearm.

12. The device of claim 11, wherein said supporting member is disposed at a position between said stylus and the center of said record disk.

* * * * *